UNITED STATES PATENT OFFICE.

WILLIAM GODSON LINDSAY, OF NEWARK, NEW JERSEY, ASSIGNOR TO THE CELLULOID COMPANY, A CORPORATION OF NEW JERSEY.

NON-INFLAMMABLE CELLULOSE COMPOUND.

1,386,576.     Specification of Letters Patent.    Patented Aug. 2, 1921.

No Drawing. Original application filed September 10, 1912, Serial No. 719,543. Patent No. 1,199,799, dated October 3, 1916. Divided and this application filed September 1, 1916. Serial No. 118,003.

*To all whom it may concern:*

Be it known that I, WILLIAM GODSON LINDSAY, a citizen of the United States, residing at Newark, in the county of Essex and State of New Jersey, have invented certain new and useful Improvements in Non-Inflammable Cellulose Compounds, of which the following is a full, clear, and exact specification.

This invention relates to a new composition of matter which in non-inflammable, and which possesses permanently great strength and tenacity, and can be used as a substitute for nitro-cellulose compositions such as celluloid and similar substances, and also to the process of making the same. The present application is a division of my application No. 719,543, filed September 10, 1912.

Heretofore, it has been proposed to substitute acetyl cellulose for nitro-cellulose for the purpose of obtaining a non-inflammable material having the properties of celluloid, but so far as I am aware prior to my invention such compounds have been unsuccessful.

I have discovered that tricresylphosphate and certain other substances can be combined with acetyl cellulose to produce a non-inflammable compound having great strength and tenacity, and other valuable properties, and the present invention is designed to point out to the operator a practical method of using or combining these two substances in making films and other forms of such compounds. So far as I know, I am the first, not only to use tricresylphosphate with acetyl cellulose, but I am also the first to discover the method of making a useful product or compound containing acetyl cellulose and tricresylphosphate.

In carrying out my invention I preferably select an ecetyl cellulose which is soluble in acetone; although I do not confine myself to this particular variety of acetylcellulose, for others may be used. A solution is made of the acetyl cellulose in acetone or other suitable solvent and to this solution is added triphenylphosphate, either in solid form or previously dissolved in actone or other similar solvent. I also add 10 to 25 parts of dichlorhydrin (or its hereinafter specified equivalent). The amount of tricresylphosphate may be varied in proportions from ten to twenty parts by weight to each one hundred parts of the acetyl cellulose, and the acetone or other suitable solvent is added in sufficient quantity to make either a flowable solution or a plastic mass, as is well understood by those skilled in the art; but I do not limit myself to any specific proportions because they may be diminished or increased as desired.

The degree of strength and tenacity of the product will depend upon the variety of acetyl cellulose employed in solution or in combination or mixture as the basic ingredient; but the addition of tricresylphosphate increase both the strength and tenacity and also insures non-inflammability. This increase in strength and tenacity may, as I have found by experiment, be secured in greater or less degree by substances which are to a large extent equivalents of tricresylphosphate, such as diphenylamin, trichlorphenol, triphenylphosphate, and, to a lesser extent, phenolsalicylate. Again, as indicated, I may use other menstrua or solvents than acetone, such for instance as chloroform, ethyl acetate or acetylene tetrachlorid, which, either alone or when two or more of them are mixed together, are capable of dissolving the acetyl cellulose in the presence of tricresylphosphate or other substances indicated above. I have also found that it may be useful in some cases to use alcohols in the solvent mixture both for the purpose of causing fluidity and for regulating the evaporation of the solvent.

As indicated above, the solvent or menstruum may be formed of one or more substances in addition to, or in substitution of, acetone; in fact, any one or more of the solvents or menstrua of an acetyl cellulose, or similar cellulose compositions, may be employed, provided the solvent is also a solvent of the tricresylphosphate or other substance used in place thereof.

A further advantage in employing these solvent or menstrua substances in the case of some of the heavy solvents arises from their property of restraining or modifying the volatility of the mixture; acetylene tetrachlorid, when used alone, or with chloroform, alcohol, ethyl acetate or the like, in varying proportions, is especially useful in this connection. In place of dichlorhydrin I may use diacetic ether, benzoic ether, acetodichlorhydrin, or any slowly volatile solvent of acetyl cellulose which is capable of dissolving or liquefying tricresylphosphate, or its specified equivalent, in the presence of acetyl cellulose. By preference, however, I use dichlorhydrin, for its action exemplifies in the highest possible manner the combination principles referred to.

The addition of 1½% urea will insure permanency of strength and tenacity to the compound. The proportion of urea or equivalent substance will vary according to the desired degree of stability of final product. A proportion of two parts urea to one hundred parts of the cellulose compound gives most excellent results; a less proportion is sufficient for ordinary purposes. I have obtained satisfactory results with a proportion of urea as low as one part to one hundred parts of the cellulose compound.

For certain purposes, it is advantageous to make a thorough mechanical mixture containing the acetyl cellulose and tricresylphosphate, or equivalent substances, and subsequently add the solvent or liquid menstruum.

The product made in accordance with my invention can be made in the form of films or thin sheets. Any approved method of forming films or thin sheets from a flowable solution may be employed. It will be understood, also, that the flowable solution formed as above described may be applied as a protecting surface, such a coating possessing also the property of being waterproof. The final product may also be made in the form of a mass of any desired thickness. It will be obvious that suitable pigments or coloring matter may be added to the above mixture or solution to produce a final product for use in imitating other substances, such as amber, ivory, horn, marble, or the like.

Where I employ the expression "acetyl cellulose soluble in acetone" in the claims, it is to be understood that I mean such variety of acetyl cellulose which is freely soluble in acetone, and that this variety of acetyl cellulose is substantially completely soluble in acetone.

Having thus described my invention I declare that what I claim as new and desire to secure by Letters Patent, is:—

1. A composition of matter containing an acetyl cellulose and tricresylphosphate in admixture with a solvent common to both.

2. The process of making a composition of matter which consists in combining an acetyl cellulose and tricresylphosphate by the use of a solvent common to both.

3. A composition of matter containing an acetyl cellulose and tricresylphosphate in admixture with dichlorhydrin and a solvent of said acetyl cellulose and tricresylphosphate.

4. A composition of matter containing an acetyl cellulose and tricresylphosphate in admixture with dichlorhydrin and acetone.

5. A composition of matter containing an acetyl cellulose soluble in acetone and tricresylphosphate in admixture with dichlorhydrin and acetone.

6. The process of making a composition of matter which consists in combining an acetyl cellulose and tricresylphosphate by the use of dichlorhydrin and a solvent of said acetyl cellulose and tricresylphosphate.

7. The process of making a composition of matter which consists in combining an acetyl cellulose and tricresylphosphate by the use of dichlorhydrin and acetone.

8. A composition of matter containing an acetyl cellulose, tricresylphosphate and urea in admixture with a mutual solvent of said acetyl cellulose and tricresylphosphate.

9. The process of making a composition of matter which consists in combining an acetyl cellulose, tricresylphosphate and urea by the use of a mutual solvent of said acetyl cellulose and tricresylphosphate.

10. A composition of matter containing an acetyl cellulose, tricresylphosphate and urea in admixture with dichlorhydrin and a solvent of said acetyl cellulose and tricresylphosphate.

11. A composition of matter containing an acetyl cellulose soluble in acetone, tricresylphosphate and urea in admixture with dichlorhydrin and a solvent of said acetyl cellulose and tricresylphosphate.

12. The process of making a composition of matter which consists in combining an acetyl cellulose, tricresylphosphate and urea by the use of dichlorhydrin and a solvent of said acetyl cellulose and tricresylphosphate.

In testimony whereof I affix my signature, in presence of two witnesses.

WILLIAM GODSON LINDSAY.

Witnesses:
   ELSIE GREENBERGER,
   C. GALVION.